United States Patent Office 3,052,512
Patented Sept. 4, 1962

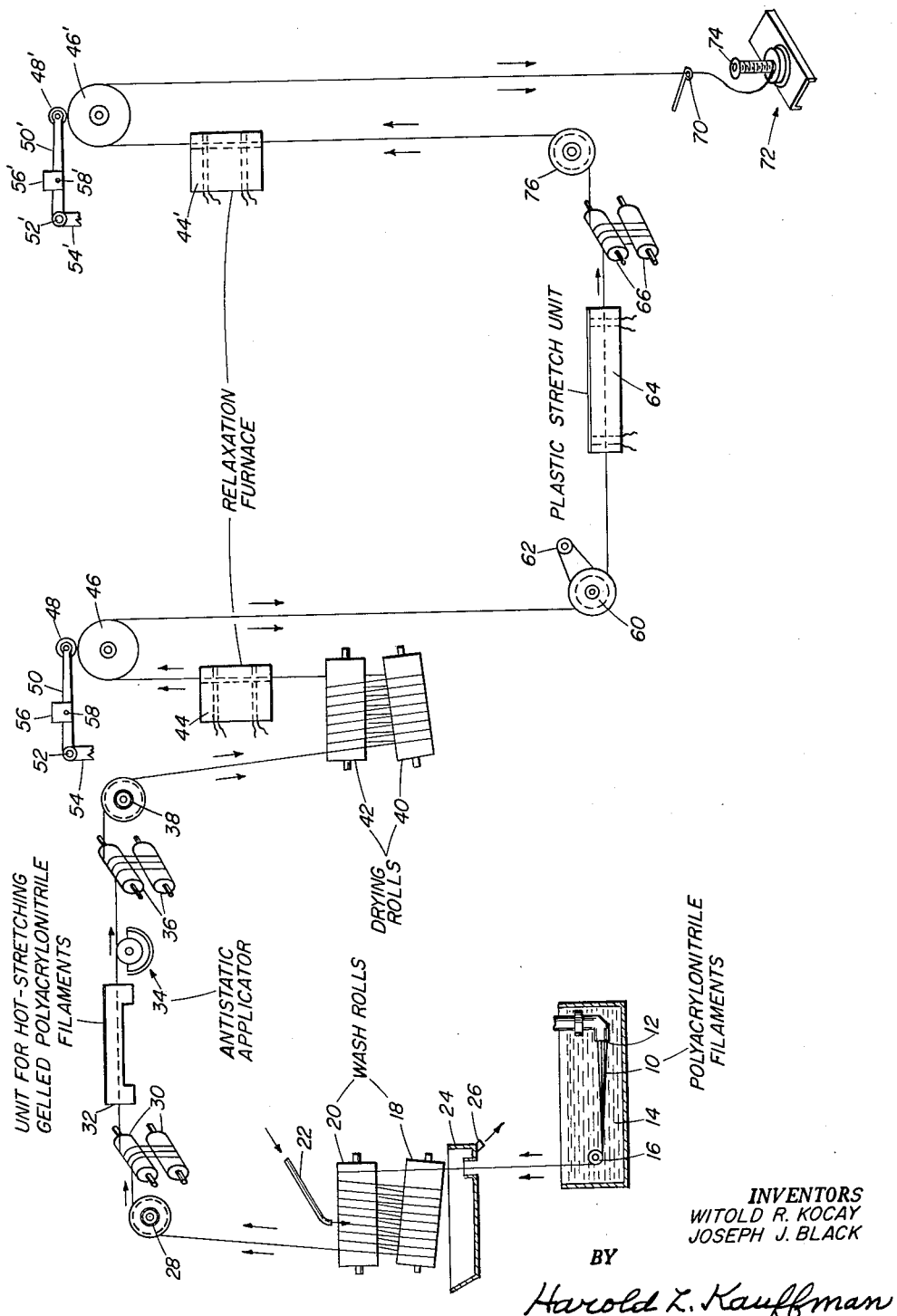

3,052,512
ART OF PRODUCING POLYACRYLONITRILE FILAMENTARY MATERIALS
Witold R. Kocay and Joseph J. Black, Stamford, Conn., assignors to American Cyanamid Company, New York, N.Y., a corporation of Maine
Filed June 14, 1960, Ser. No. 36,039
8 Claims. (Cl. 18—54)

This invention relates broadly to the art of producing polyacrylonitrile filamentary materials. More particularly it is concerned with the production of such materials from a soluble acrylonitrile polymerization product containing an average of at least 70%, preferably at least 80%, by weight of combined acrylonitrile. Still more particularly the present invention is concerned with a new and improved method of producing a filamentary material form a soluble, fiber-formable, acrylonitrile polymerization product, e.g., homopolymeric acrylonitrile or a copolymer containing at least 70% by weight of combined acrylonitrile while the remainder is at least one other monoethylenically unsaturated substance combined in the copolymer molecule. This method comprises wet-spinning a solution of the said polymerization product to form a gelled, filamentary material; continuously stretching the resulting gelled, filamentary material in the presence of moisture and at a temperature within the range of from about 60° C. to about 130° C., and specifically while it is passing through a fluid medium comprising water maintained at a temperature within the range of from about 70° C. to about 120° C. The amount of the stretch that is applied to the gelled filamentary material at this stage is such that the denier of the dried and relaxed filamentary material is higher than the denier of the final product.

The subsequent steps in the process of this invention include continuously drying the stretched, gelled, filamentary material, more particularly under tension, e.g., a tension proportionate to the shrinkage that takes place so that the length remains constant (substantially constant); continuously heating the dried, stretched, filamentary material at a temperature higher than the temperature at which it was dried and while it is relaxed and capable of contracting linearly; and continuously stretching (so-called "plastic" stretching) the dried and relaxed filamentary material at least 20%, e.g., from 30 or 40% to 400 or 500%, of its length immediately prior to said stetching.

The total stretch (that is, the stretch or stretches in a hot fluid medium prior to drying and the plastic stretch) may amount to, for example, from 5 or 6 times (400% or 500%) to 24 times (2300%) that of the original length of the gelled filamentary material but is usually within the range of from about 8 times to about 16 times the original length of the gelled, filamentary product. The products resulting from the method are, in general, at this stage filamentary materials which contain relatively high residual shrinkage and are, therefore, suitable for the production of so-called "high-bulk" yarns.

To produce filamentary materials containing from 0% to about 2% or 3% residual shrinkage, the product obtained after continuously stretching the dried and relaxed filamentary material is again continuously heated at a temperature higher than the temperature at which it was dried and while it is relaxed and capable of contracting linearly; for example, while it is passing through a zone heated to a temperature ranging from 160° C. to 280° C.

A specific aspect of the present invention is concerned with a method of producing a filamentary material from a soluble, fiber-formable, acrylonitrile copolymer of the kind with which this inventtion is concerned, more particularly one containing, by weight, at least 80% of combined acrylonitrile and the remainder being at least one other copolymerizable, monoethylenically unsaturated substance combined in the copolymer molecule. This method comprises extruding a solution of the said copolymer through a plurality of openings to form a gelled, filamentary material; continuously stretching the resulting, gelled, filamentary material in the presence of a fluid medium comprising water and at a temperature within the range of from about 70° C. to about 120° C., the amount of the applied stretch being from about 200% to about 800% that of the length of the said filamentary material immediately prior to the said stretch; continuously drying the stretched, gelled, filamentary material, more particularly under tension; and continuously heating the dried, stretched, filamentary material, while it is relaxed and capable of contracting linearly, at a temperature substantially above, e.g., from about 50° C. to about 250° C. above, that required to obtain a desired percent of relaxation in the aforesaid filamentary material, thereby to improve the dye-receptivity of the said filamentary material.

Practicing of the present invention is facilitated and optimum results are obtained when the gelled filamentary material is treated with an antistatic composition (i.e., a composition containing an antistatic agent), at a stage not later than the drying operation. For example, the antistatic composition may be applied concurrently with the primary stretching of the filaments (e.g., as a component of an aqueous hot-stretch bath), or immediately after said stretching but before drying, or during drying of the filaments.

In some cases when the filamentary material cannot be plastic drawn (i.e., thermally stretched) after thermal relaxation of the dried yarn, we have surprisingly found that a satisfactory plastic stretch can be effected when the gelled filamentary material has been treated, not later than the step of drying, with a suitable antistatic, textile-finishing composition. One class of such compositions, and which is so superior in its effectiveness that it cannot be considered the equivalent of other known classes or species of antistatic, textile-finishing compositions, is that disclosed and claimed in the copending application of Witold R. Kocay and Derek J. Brady, Serial No. 823,339, filed June 29, 1959, and which is assigned to a common assignee with that of the present application. More detailed information will be given later herein concerning the compositions of the aforesaid Kocay and Brady application, which, including the disclosure in the patents cited therein, by this cross-reference is made a part of the disclosure of the present application for additional details.

It is to be understood, however, that the use of other antistatic, textile-finishing compositions is not precluded, among which may be mentioned the guanylurea and gunaidine salts of mono-aliphatic hydrocarbon esters of sulfuric acid, more particularly such salts wherein the aliphatic hydrocarbon grouping contains from 12 to 18 carbon atoms, inclusive, e.g., guanylurea octadecyl hydrogen sulfate, guanidine octadecyl hydrogen sulfate, guanidine oleyl hydrogen sulfate, etc. Other examples of such guanylurea and guanidine salts are described in Cresswell U.S. Patents 2,581,836, dated January 8, 1952, and 2,597,708, dated May 20, 1952. Still other examples of antistatic agents which may be used are beta-alkoxypropionitrile, e.g., octadecoxypropionitrile; reaction products of ethylene oxide and a long-chain alkyl guanamine, e.g., octadecyl guanamine; and reaction products of ethylene oxide and a long-chain alkyl guanidine, e.g., octadecylguanidine. The antistatic agent is preferably used in conjunction with other conditioning or effect agents. Such auxiliary conditioning agents include mineral, vegetable and animal oils, among which latter may be mentioned blown and unblown neat's-foot oil, sperm oil, olive oil, castor oil, teaseed oil, peanut oil, soya bean oil and cottonseed oil, as well as the various sulfonated oils, e.g., sulfonated olive oil, and reaction products of ethylene oxide with reactive vegetable and animal oils, e.g., castor oil. Examples of other conditioning agents that may be employed in conjunction with the antistatic agent are wetting and dispersing agents, as well as other effect agents, including, for example, N-octadecyl disodium sulfosuccinamate, dioctyl sodium sulfosuccinate, lecithin, esters of long-chain fatty acids, e.g., alkyl stearates, palmitates and oleates, more particularly the ethyl, propyl, butyl and amyl stearates, palmitates and oleates.

Various methods of producing filaments, films and other shaped articles from polyacrylonitrile (polymeric acrylonitrile) and from copolymers or interpolymers of a major proportion of acrylonitrile and a minor proportion of another monomer or monomers heretofore have been suggested. For example, in Rein U.S. Patent No. 2,117,210, dated May 10, 1938, it is proposed that polyacrylonitrile be dissolved in a quaternary ammonium compound, more particularly, a pyridinium compound such as benzyl pyridinium chloride, and that the resulting solution be employed in making films, threads and other shaped bodies therefrom. Also, in Rein U.S. Patent No. 2,140,921, dated December 20, 1938, it is proposed that various polyvinyl compounds including polyacrylonitrile and copolymers of acrylonitrile with another vinyl compound be dissolved in concentrated aqueous solutions of inorganic (metal) salts, e.g., the chlorides, bromides, iodides, thiocyanates, perchlorates and nitrates, and that the resulting solutions be used in the manufacture of threads, films, etc. Various organic solvent solutions of homopolymeric acrylonitrile and copolymers of at least 85% by weight of acrylonitrile with another monomer are disclosed in Latham U.S. Patent 2,404,714; Rogers U.S. Patents 2,404,715 and -725; Hansley U.S. Patent 2,404,716; Houtz U.S. Patents 2,404,713, -722, -724 and -727; Merner U.S. Patent 2,404,723; Charch U.S. Patent 2,404,726; and Finzel U.S. Patent 2,404,728, all dated July 23, 1946, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

Another method of producing filaments and other shaped products from polymers and copolymers of acrylonitrile is disclosed and claimed in Cresswell U.S. Patent No. 2,558,730, dated July 3, 1951. The invention disclosed and claimed in that patent is based on the discovery that useful films, filaments, threads and other shaped articles can be produced from acrylonitrile polymerization products of the kind described therein and in the aforementioned patents, as well as hereinafter, by precipitating or coagulating the polymerization product in approximately its desired shape from a water-coagulable solution thereof, more particularly, a concentrated aqueous salt solution of the kind disclosed by Rein in his U.S. Patent No. 2,140,921, the precipitation being effected by contacting the said solution with a cold aqueous coagulant, more particularly water alone, at a temperature not substantially exceeding +10° C. This coagulant is a non-solvent for the polymerization product but will dissolve the solvent in which the said product is dissolved. Surprisingly, it was found that by keeping the temperature of the aqeous coagulating bath at or below +10° C., e.g., within the range of −15° C. to +10° C. and preferably at from about −15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product.

Still other methods of producing filamentary material from a polymer of acrylontrile are known. For example, British Patent No. 714,530 describes a method wherein a thread is formed from a spinning solution containing a polyacrylonitrile and, as a solvent therefor, a mixture consisting essentially of water, one or more water-miscible, aliphatic liquids containing an alcoholic hydroxyl group and not more than 6 carbon atoms in the molecule, and one or more highly water-soluble salts of a particular class which includes the alkali-metal thiocyanates. In another process of producing threads from a polymer of acrylonitrile (British Patent No. 732,135), a solution of the polyacrylonitrile in a concentrated aqueous solution of a water-soluble salt that yields highly hydrated ions in an aqueous solution is extruded into an aqueous coagulating bath in which is dissolved at least 5% by weight of the same water-soluble salt used as a solvent for the polymer, the coagulating bath also containing a water-miscible alcohol.

It was also known prior to the present invention that the properties, e.g., dry and wet tenacities, of a polyacrylonitrile filamentary material could be improved by first applying to the gelled, polyacrylonitrile filamentary material a so-called "cold-solvent" stretch to a particular extent while the gelled material contained water and also a critical amount of an alkali-metal thiocyanate; treating, e.g., washing, the thusly stretched filamentary material for the removal of thiocyanate therefrom; and then hot-stretching the treated filamentary material a second time to a particular extent under particular conditions. This is disclosed in, for example, the copending application of Percival W. Cummings, Jr., Serial No. 554,155, filed December 20, 1955, assigned to the same assignee as the present invention, and now Patent No. 2,948,581.

It was also known that the properties of a polyacrylonitrile filamentary material could be improved by continuously passing a dried, polyacrylonitrile filamentary material, while relaxed and free to contract linearly, through a heated zone maintained at a temperature within the range of 100° C. to 500° C. at a rate such that the time at which any given point on the said fiber is within the said zone is from 0.01 to 5 seconds, the temperature of the said zone and the rate at which the dried, relaxed fiber is passed therethrough being such that no substantial decomposition of the fiber occurs. This is disclosed in, for example, Cresswell et al. U.S. Patents 2,558,733 and 2,614,289.

Weinstock, Jr. U.S. Patent No. 2,692,875 also discloses that a filamentary material comprised of particular percentage proportions of acrylonitrile and methacrylonitrile may be improved in its useful properties, e.g., the ultimate elongation may be increased and the shrinkage of the products when boiled in water may be practically eliminated, and their shrinkage when heated to higher ironing temperatures of the order of 150° C. may be reduced to a point at which it is negligible, by a supplemental "relaxing" treatment of the yarns or filaments following the stretching step. It is also suggested in this patent that additional treatments of the yarns or filaments may be desirable for certain purposes, among which are specifically mentioned an annealing step wherein the yarns or filaments are heated for a short period of time at elevated temperatures while held under sufficient tension to prevent any shrinkage of the yarns or filaments. This annealing step may be carried out after the stretching step but before the relaxing treatment, or it may be carried out after the relaxing step.

It was also suggested prior to the present invention to wet-spin an acrylonitrile polymerization product (Terpay U.S. Patent No. 2,716,586) and to subject the fibers after removal from the coagulating liquid to one or more stretching operations. Terpay discloses that such a stretching operation may be accomplished in two steps, the first, an air stretch immediately after leaving the coagulating bath, and the second, in a hot aqueous stretching bath, e.g., a water bath, at a temperature above about 80° C. and preferably about 100° C. and above.

The present invention is based on our discovery that the properties, e.g., the physical, thermal and dyeing properties of a polyacrylonitrile filamentary material, can be improved as is more fully descirbed in the portion of this specification which follows, including the illustrative examples. Additionally, the present invention makes it possible to greatly increase the spinning speed of a machine having a particular number of spinning units, and particularly for each unit of said machine, and to reduce the cost of production of filaments of fine deniers per spinning unit. Or, in other words, the production of filaments of fine deniers per spinning unit is greatly increased.

The novel features which are characteristic of our invention are set forth in the appended claims. The invention itself, however, will best be understood by reference to the following more detailed description when considered in connection with the accompanying drawing in which the single FIGURE shows somewhat schematically the several steps involved in the method of the invention and illustrative only of apparatus that can be used in practicing the method.

Referring to the single figure of the accompanying drawing, it is there indicated that the first step is the formation of a gelled, polyacrylonitrile filamentary material. Any suitable method may be used in preparing the gelled filaments but a preferred method involves dissolving an acrylonitrile polymer, that is, a homopolymer or copolymer of acrylonitrile, in a concentrated aqueous solution of an alkali-metal thiocyanate (e.g., sodium thiocyanate, potassium thiocyanate, lithium thiocyanate, etc.) to form a spinning solution. The concentration of the alkali-metal thiocyanate in the water in all cases is sufficiently high so that the resulting solution will dissolve the acrylonitrile polymer. In most cases the concentration of thiocyanate is substantially above 40% (e.g., from 45–50% to 55–60%) of the total weight of the solution of thiocyanate dissolved in water, the upper limit being a saturated solution of the thiocyanate in water.

In forming the gelled, polyacrylonitrile filaments, an alkali-metal thiocyanate solution of an acrylonitrile polymer of the kind described above, after filtration and deaeration, is passed under pressure to an extrusion head and thence through the openings or orifices in a spinnerette into a liquid coagulating bath comprising an aqueous solution containing from about 5% to about 20%, by weight, of an alkali-metal thiocyanate. From a practical standpoint and to simplify the recovery problem, it is desirable that the thiocyanate employed in producing the liquid coagulating bath be of the same kind as that used in forming the concentrated aqueous solution in which the acrylonitrile polymerization product is dissolved.

For further details on the composition of the preferred spinning solution and of the coagulating bath and the temperatures of each, and other more detailed information on the spinning and coagulating conditions, see, for example, Creswell et al. U.S. Patent 2,558,733 and Cresswell U.S. Patent 2,916,348.

In the drawing it is shown that the gelled, polyacrylonitrile filamentary material 10 being drawn away from the face of the spinnerette 12 is coagulated in the bath of liquid coagulant 14 and then led out of the said bath to suitable washing means. The spinnerette assembly and the coagulating bath may be so constructed and positioned that the freshly spun filamentary material can be led directly from the bath to the washing means. Or, as shown in the drawing, the freshly spun filaments can be led over a guide roll 16 which is immersed in the aforesaid coagulating bath, to the washing means.

Any suitable means of washing the gelled filamentary material can be employed. Such means may take the form of a thread-advancing device, e.g., a reel or, as shown in the drawing, a pair of converging wash rolls 18 and 20 over which the thread is caused to move in a helical path while washing fluid, e.g., water, is applied to the moving filaments by means of the applicator 22. The excess washing fluid drips off the rolls into the trough 24 which is positioned immediately below the rolls. This trough or basin is provided with the exit conduit 26 through which the washing fluid can be conducted to the coagulating bath, to a suitable recovery system or to waste disposal.

Instead of having the wash rolls 18 and 20 arranged as shown in the drawing, that is, wherein one of the rolls is positioned horizontally while the axis of the other is in the same vertical plane but is inclined thereto, effective washing also can be obtained by having one of the rolls in a vertical position while the axis of the other forms a converging angle therewith so that the gelled filaments move in a helical path along the rolls while they are being washed.

For additional details on the washing technique see, for instance, the aforementioned Cresswell et al. Patent No. 2,558,733.

The washed, gelled, filamentary material leaving the wash rolls 18 and 20 is next continuously stretched in the presence of moisture, specifically water, and at a temperature within the range of from about 60° C. to about 130° C. This may be done as shown by way of illustration in the accompanying drawing and wherein the washed filaments pass over a guide roll or pulley 28 and then are wrapped several times over the draw rolls 30. The guide roll 28 may be unnecessary if the draw rolls 30 are positioned so that the filaments leaving the take-off end of the wash rolls can be led directly to said draw rolls.

From the draw rolls 30 the filamentary material is passed continuously through the stretching unit 32. This stretching unit may take the form of a tube through which saturated or superheated steam is passed. Or, as shown in the drawing, it may be a trough containing a hot, aqueous, liquid medium, e.g., water and/or steam (if the latter is required) at a temperature of from about 60° C. to about 130° C., and preferably about 70° C. to about 120° C. Instead of a single trough one can use a series of troughs, e.g., two, three or more troughs. For further information on such troughs see the aforementioned Cresswell et al. Patent No. 2,558,733.

After being treated with an antistatic composition, preferably an antistatic composition of the kind disclosed and claimed in the copending application of Witold R. Kocay and Derek J. Brady, Serial No. 823,339, filed June 29, 1959, by means of the antistatic applicator 34, the filamentary material leaving the stretching unit 32 is led to the stretch draw rolls 36 which are operated at a higher peripheral speed than the draw rolls 30 in order to impart the desired stretch to the gelled, filamentary material. The amount of the stretch that is applied in this manner may be varied over a wide range, but is always such that the denier (both total denier and denier per filament) of the dried and relaxed filamentary material is higher than the denier of the final product. For example, the gelled filaments may be hot-stretched in this way from about twice their length immediately prior to stretching (i.e., a stretch of about 100%) to about 9 or 11 times said length (i.e., a stretch of about 800% or 1000%). Stretching orients the molecules of the acrylonitrile polymerization product along the fiber axis.

From the stretch draw rolls 36 the stretched, gelled, filamentary material passes over the guide roll or pulley 38 to the drying rolls 40 and 42. These rolls are arranged so that the axis of one converges toward the axis of the other in a manner similar to, and for the same purpose as, the wash rolls 18 and 20. These rolls are internally heated by suitable means, e.g., by an electrical resistance heater with wires running along the inner length of both rolls and held in position close to the surfaces thereof. In this way the filaments are dried while they are passing in a helical path over the surfaces of the rolls, at least a portion of which is heated to a temperature within the range of about 40° C. to about 200° C. For further information on the construction and operation of such drying rolls, see the aforementioned Cresswell et al. Patent No. 2,558,733.

As in the case of the guide roll 28 so, too, the guide roll 38 may be unnecessary if the stretch draw rolls 36 are positioned so that the continuous filaments leaving the take-off end thereof can be led directly to the feed-on end of the drying rolls 40, 42.

The filamentary material leaving the delivery or take-off end of the drying rolls is next led, while relaxed and free to contract linearly, through a slot in a heat-treating or relaxation unit or furnace 44, and thence over the relaxation roll or godet 46, which is caused to rotate at a peripheral speed less than that of the drying rolls 40 and 42. In other words, the surface speed of godet 46 is such that the ratio of speeds of said godet and said drying rolls is proportional to the relaxation to be effected upon the dried filamentary material as it passes through the slot in the heat-treating or relaxation furnace 44. The heat-treated thread or bundle of filaments is prevented from slipping as it passes over the godet 46 by means of the pinch roll 48 mounted in a roll support which is located at the forward end of the arm 50. This arm is pivotally mounted at its other end upon the shaft 52 carried by the support 54. On the arm 50 is slidably mounted a weight 56 which can be held in position at any point on the arm by tightening the screw 58. By adjusting the position of the weight 56 on the arm 50, the pressure or pinch applied to the heat-treated filamentary material as it passes between the pinch roll 48 and the godet 46 can be varied as may be desired or required in order to effect the desired degree of relaxation. Ordinarily, the percentage of relaxation (linear shrinkage) that is effected is from about 3% to about 30% of that of the continuous filamentary material immediately prior to relaxation.

The percentage of relaxation or linear shrinkage referred to in the preceding paragraph and elsewhere herein is determined by heating a length of the filamentary material in boiling water having a pH of about 7.0 (i.e., substantially neutral water) and at atmospheric pressure until no further change in the length of the dried filamentary material takes place. Generally an equilibrium is reached after ten minutes' immersion in the aforementioned neutral, boiling water. The percentage of relaxation or shrinkage is the shrunken length of the filamentary material divided by its length prior to immersion in the boiling water times 100.

Instead of the pinch roll 48 and auxiliary apparatus as shown in the drawing, any other suitable arrangement of rolls can be used whereby the desired amount of relaxation is effected by operating them at a peripheral speed less than that of the drying rolls 40, 42.

The heated zone of the relaxation unit 44 is maintained at a temperature within the range of from about 100° C. to about 500° C., and preferably within the range of from about 150° C. to about 400° C. The relaxed, free-to-shrink (free-to-contract) filamentary material is passed through the aforesaid zone at a rate which will heat the filaments sufficiently to effect the desired amount of shrinkage, for example at a rate such that the time at which any point on the continuously moving filaments is within the said zone is from about 0.01 second to about 5 seconds, preferably from about 0.01–0.1 second to about 1.0 second. The temperature of the hot zone and the rate at which the dried, relaxed, filamentary material is passed therethrough are such that no substantial decomposition of the filaments occurs.

For additional information on the construction and operation of the relaxation unit or furnace 44, the godet 46 and the pinch roll 48, reference is again made to the aforementioned Cresswell et al. Patent No. 2,558,733.

A modification of the operation of the relaxation unit 44 (that is, of both units 44 and 44' which are involved in practicing the present invention), and which is not disclosed or anywhere taught or suggested in the aforesaid Cresswell et al. Patent No. 2,558,733, involves the injection of dry steam or moderately saturated steam in front of the heated slot, channel or other passageway through which the thread or bundle of filaments is passed while relaxed and capable of contracting linearly. We have discovered that in many, if not in all cases, it is beneficial (from the standpoint of, for example, better and more uniform results) to use this combination of steam and dry heat rather than to use dry heat alone.

From the godet 46 the filamentary material is passed over the roll or godet 60 and the auxiliary roll 62, being wrapped one or more (e.g., two or three) times about each, and thence through the plastic stretch unit 64. This unit may take the form of, for example, a metallic bar having a longitudinal groove or slot therein, the latter being heated by electrical resistance coils or other suitable means.

In the plastic stretch unit 64 the filamentary material is hot drawn (i.e., given a plastic stretch) from, for example, about 1.2 times its length immediately prior to hot-drawing (i.e., a plastic stretch of about 20%) to about 4 or 5 times said length (i.e., a plastic stretch of about 300 or 400%). Stretching is effected by causing the plastic stretch draw rolls 66 to revolve at a peripheral speed higher than that of godet 60. In other words, the surface speed of the draw rolls 66, about which the filamentary material is wrapped several times, is such that the ratio of speeds of said draw rolls and of the said godet is proportional to the plastic stretch to be effected upon the previously dried and relaxed filamentary material as it passes through the passageway in the plastic stretch unit 64.

The heated zone of the stretch unit 64 through which the filaments pass is maintained at a temperature within the range of, for example, from about 160° C. to about 280° C., and preferably within the range of from about 180° C. to about 230° C. The filamentary material is passed through the aforesaid zone at a rate such as will sufficiently soften the filaments so that they can be stretched or drawn the desired percentage at the selected operating temperature, for example at a rate such that the time at which any point on the continuously moving filaments is within the said zone is from about 0.01 second to about 5.0 seconds, preferably from about 0.01 second to about 1.0 second. The temperature of the heated passageway and the rate at which the filamentary material is passed therethrough are such that no substantial decomposition of the filaments occurs, and preferably such that a minimum of discoloration takes place.

When it is desired to obtain continuous filament yarn having a high (or relatively high) residual shrinkage, e.g., a residual shrinkage of from about 5% to about 35%, and which, therefore, can be used in the production of so-called "high-bulk" yarns, the filamentary material leaving the plastic stretch draw rolls 66 can be passed to a guide roll (not shown) if required, and thence to the pigtail thread guide 70 and finally to a suitable twister such, for example, as the ring twister 72 whereby the twisted continuous filament yarn is collected on the bobbin 74.

To produce polyacrylonitrile filamentary material having zero or low residual shrinkage, e.g., up to about 2 or 3%, the bundle or thread of filaments is led from the delivery end of the draw rolls 66 to the guide roll 76. This guide roll may be unnecessary if the plastic stretch draw rolls 66 are positioned so that the continuous filaments leaving the take-off end thereof can be passed directly through the heated slot in the second relation unit or furnace 44'. The construction and operation of the second relaxation unit 44', wherein the filamentary material is again heated while it is relaxed and free to shrink linearly, and of the second elements 46', 48', 50', 52', 54', 56' and 58', are essentially the same as the correspondingly numbered (without the prime mark after each number) elements which previously have been described, with the following exceptions:

From the godet 46' the continuous filamentary material is led through the pigtail thread guide 70 and then is collected on the bobbin 74 as previously has been described with reference to the collection of continuous filaments from the plastic stretch draw rolls 66 when the relaxation furnace 44' is by-passed.

In the drawing it is shown that the last sequence of operations, viz., plastic stretch plus relaxation, is carried out only once. However, in some cases the composition of the filaments (including the antistatic finish applied thereto) or the properties wanted in the end product are such that the desired results either cannot be obtained, or can be obtained only with difficulty, when the aforementioned sequence is carried out only once. Surprisingly, we have found that the desired results, in the cases just mentioned, can be obtained with no difficulty when the said sequence (i.e., plastic stretch plus relaxation) is repeated one, two, three or any higher number of times that may be necessary in order to produce filaments of the desired denier and properties. Such repetitive sequences of plastic stretch plus relaxation are within the scope of this invention.

By practicing our invention one can wet-spin a solution of a polymer of acrylonitrile to obtain what normally would be a continuous filament yarn of, for example, 15 denier per filament and convert it to a yarn of, for example, 5 denier per filament; or, as another example, a yarn of 3 denier per filament and convert it to a yarn of ½ denier per filament. Such extremely fine deniers of continuous filament yarn, that is, of the order of ½ denier/filament cannot in commercial practice, to the best of our knowledge and belief, be wet-spun from a solution of a polymer of acrylonitrile by any other wet-spinning processes heretofore known to the art. From this it will be seen that the present invention amplifies the field of utility of such processes in the production of polyacrylonitrile filaments, the advantages of which will be readily apparent to those skilled in the art. Furthermore, by practicing the present invention the spinning speed per spinning position and, therefore, of the whole spinning machine can be greatly increased. As a result, the cost of production of filaments of fine deniers is greatly reduced.

By carrying our invention into effect the physical (including thermal) and dyeing properties of a polyacrylonitrile continuous filament yarn are greatly and unobviously improved. This is evidenced by the following improvement in dyeing characteristics.

In one case (A) a yarn was made from a ternary polymer obtained by copolymerization of a mixture of, by weight, 7.5% 2-methyl-5-vinylpyridine, 7.5% vinyl acetate and 85% acrylonitrile. In another case (B) a yarn was made from a ternary polymer obtained by copolymerizing a mixture of, by weight, 3% 2-methyl-5-vinylpyridine, 3% vinyl acetate and 94% acrylonitrile. Both yarns were made in accordance with the present invention. Before plastic stretching and relaxation, yarns (A) and (B) were 3.0 den./fil. and 1.6 den./fil., respectively. In their final form they were collected as 2.3 den./fil. for yarn (A) and 0.7 den./fil. for yarn (B). In both cases the yarns which had been plastic stretched and relaxed dyed much faster and in depth of color—about 150% better for yarn (A) and about 200% better for yarn (B)—as compared with these same yarns which had not been plastic stretched and relaxed but had been processed as hereinbefore described up to the step of plastic stretching. These are unobvious results which in no way could have been predicted from the prior art. As a matter of fact, it was unobvious and could not have been predicted from the teachings of the prior art that a dried and relaxed polyacrylonitrile filamentary material (and especially one having no plasticizer incorporated therein) could have been given any plastic stretch whatsoever without detrimentally affecting its useful properties.

In order that those skilled in the art may better understand how the present invention can be carried into effect, the following examples are given by way of illustration and not by way of limitation. All parts and percentages are by weight unless otherwise stated.

EXAMPLE 1

A 10% solution of ternary polymer comprised of about 6% 2-methyl-5-vinylpyridine, about 5.5% vinyl acetate and about 88.5% of acrylonitrile dissolved in a 48% aqueous solution of sodium thiocyanate is extruded through a 45-hole spinnerette with 75µ hole diameter into a coagulating bath of a 10% aqueous sodium thiocyanate solution at −1° C.

The multifilament gel yarn is taken away from the face of the spinning jet at a speed of approximately 10.7 m./min., washed free of sodium thiocyanate and then stretched about 8.5 times in water at approximatley 98° C. After leaving the stretch bath an antistatic agent is applied to the continuously moving filaments, more particularly an antistatic agent of the kind disclosed and claimed in the aforementioned Kocay et al. copending application Serial No. 823,339, and specifically in Example 1, No. 1, thereof. The condensation product there described is a condensation product of 40 moles ethylene oxide per mole of caster oil in 0.5% concentration in water and the antistatic agent is stearamidopropyl dimethyl beta-hydroxyethyl ammonium dihydrogen phosphate in 3.2% concentration in water. The stretched thread is then continuously dried on convergent, electrically-heated rolls. The yarn as delivered from the drying rolls is led through a vertical retraction furnace (a horizontal retraction furnace also can be used) in which the air temperature is maintained at between 150° C. and 500° C., specifically about 200° C. ±10° C., and wherein the yarn is allowed to retract (shrink) about 17% before being collected in a form suitable for further processing. The dope delivery is so adjusted that the denier of the retracted yarn is about 135; in other words, a filamentary material of about 3 den./fil. is obtained at this stage of the process. This continuous filament yarn is now drawn by plastic stretch for an additional 264% during passage through a heated furnace wherein the air temperature of the passageway through which the filaments pass is maintained at about 305° C. The feed-in rate to the plastic-stretch unit is 30 m./min. and it is withdrawn at 79.2 m./min.

The resulting yarn is collected on a yarn-collecting and storage device and retracted again 50% at a secondary relaxation tempertaure of 345° C., in apparatus and following the general procedure described above with reference to the first retraction, before finally collecting on a twister bobbin. The final total denier is about 102, which is equivalent to about 2.2 denier per filament.

The properties of the continuous filamentary yarn before and after being plastic stretched followed by 50% retraction are shown in Table I.

Table I

|  | Before | After |
|---|---|---|
| Denier | 138.5/45 | 102.5/45 |
| Dry tenacity _____ g./d__ | 2.0 | 2.0 |
| Dry elongation _____ percent__ | 21 | 29.5 |
| Loop tenacity _____ g./d__ | 2.0 | 2.0 |
| Loop elongation _____ percent__ | 19.5 | 25.5 |
| Knot tenacity _____ g./d__ | 2.0 | 2.0 |
| Knot elongation _____ percent__ | 18.5 | 30.0 |
| Sticking temperature _____ °C__ | 216±10 | 208±10 |

EXAMPLE 2

The same procedure is followed as described above with reference to Example 1 with the following exceptions: The polymer employed is one obtained by polymerization of a mixture of 3% vinyl acetate, 3% 2-methyl-5-vinylpyridine and 94% acrylonitrile. Also, the total denier immediately before the plastic draw is 75, calculated, and about 84 actual, which includes the antistatic finish. Additionally, the total denier after the plastic draw followed by 12% retraction is 36.5 or about 0.8 den./fil.

The properties of the continuous filamentary yarn before and after being plastic stretched followed by 12% retraction are shown in Table II.

Table II

|  | Before | After |
|---|---|---|
| Denier | 84.5/45 | 36.5/45 |
| Dry tenacity _____ g./d__ | 3.5 | 5.5 |
| Dry elongation _____ percent__ | 24 | 17.5 |
| Loop tenacity _____ g./d__ | 2.5 | 4.0 |
| Loop elongation _____ percent__ | 16.5 | 13.5 |
| Knot tenacity _____ g./d__ | 2.5 | 3.5 |
| Knot elongation _____ percent__ | 15.5 | 12.0 |
| Sticking temperature _____ °C__ | 233±5 | 237±5 |

We have also made the unobvious discovery that the temperature to which the filamentary material is heated in the relaxation furnace (corresponding to element 44 in the drawing) has a marked effect upon the dye-receptivity of the relaxed filaments. It is known that a certain minimum temperature is needed in order to cause a bundle or thread of polyacrylonitrile filaments to retract by a required percent. Surprisingly it was found that, by carrying out the retraction at a temperature considerably higher than the minimum needed for the particular percentage of relaxation wanted, the filaments after such a heat treatment showed considerable improvement in dyeing rate and value.

The ordinary thermally relaxed polyacrylonitrile filaments, when subjected to either dry or humid heat treatment, show upon dyeing neither a loss nor an increase in their dye-receptivity. Hence it was completely nonobvious that heat-treatment during relaxation at a temperature substantially above, e.g., from about 50° C. to about 250° C. above, that required to secure a desired percent of relaxation (shrinkage), would result in a material (and, in many cases, an extremely high) increase in dye receptivity, even through hte percent of relaxation has been maintained constant. The improvement in dyeing rates and values that is obtained by practicing this aspect of our invention has been observed with all types of dyes, such as are used to dye wool, silk, rayon, acetate, polyamides, polyacrylonitriles, polyesters, cotton and other textile fibers.

Examples 3 through 8 are illustrative of this aspect of our invention. This aspect can be used in commercial operations without practicing the invention as a whole.

EXAMPLE 3

A 10% solutioin of a ternary polymer having the composition described in Example 2, dissolved in a 50% aqueous solution of sodium thiocyanate, is extruded through a 45-hole spinnerette with 75µ hole diameter into a coagulating bath of a 10% aqueous sodium thiocyanate solution at about —1° C. The multifilament gel yarn is taken away from a spinning jet face at a speed of approximately 10.7 m./min., washed free of sodium thiocyanate and then stretched about 8.5 times in water at approximately 98° C. After leaving the stretch bath an antistatic agent of the kind referred to in Example 1 is applied to the continuously moving filaments. The streched thread is then continuously dried on convergent, electrically-heated rolls. The yarn as delivered from the drying rolls is led through a vertical retraction furnace in which the air temperature is maintained at a sufficient level to allow the fiber to retract (shrink) about 17%. The dope delivery is so adjusted that the denier of the retracted yarn is about 75. The voltage setting for the retraction furnace is arranged so as to provide sufficient temperature, more particularly between 190° and 210° C., to retract the above-described fiber by about 17% at a spinning speed of about 75 meters per minute. The resulting yarn is tested for its dye receptivity as described in Example 7.

EXAMPLE 4

Same as in Example 3, except that the retraction temperature is 250° C.

EXAMPLE 5

Same as in Example 3, except that the retraction temperature is 400°–460° C.

EXAMPLE 6

Same as in Example 3, except that the retraction temperature is 340° C.

EXAMPLE 7

The fibers described in Examples 3, 4, 5 and 6 are scoured and dye-tested as follows:

Scour (all percentages are based on weight of fiber):
  (1) 2.5% sodium dioctyl sulfosuccinate.
  (2) Fifty times as much water as fiber being scoured (hereinafter referred to as a 50/1 ratio).
  (3) Enter fiber, raise scouring bath to 100° C. and run at 100° C. for 30 minutes. Rinse well.
Dye test—acid premetallized:
  (1) 1.0% Calcofast Wool Bordeaux R.B. conc. (U.S. Pat. No. 2,366,633).
  (2) 10.0% sodium sulfate, anhydrous.
  (3) 8.0% sulfuric acid, 96%.
  (4) 50/1 dyebath/fiber ratio set to approximately 50° C.
  (5) Enter equal weights of sample fiber and standard fiber, both previously scoured as noted above.
  (6) Raise dyebath to 100° C. in 30 minutes and continue dyeing at 100% C. for 60 minutes. Rinse fiber and dry.
Dye test—acid milling:
  (1) 1.0% Calcocid Milling Red BC conc. (old C.I. #430, new C.I. #23285).
  (2) 10.0% ammonium sulfate.
  (3) 50/1 dyebath fiber ratio set at approximately 50° C.
  (4) Enter equal weights of sample fiber and standard fiber, both previously scoured as noted above.
  (5) Raise dyebath to 100° C. in 30 minutes and continue dyeing at 100° C. for 30 minutes.
  (6) Add 1.0% formic acid, 85%.
  (7) Continue dyeing at 100° C. for 30 minutes.
  (8) Add 2.0% sulfuric acid, 96%.
  (9) Continue dyeing at 100° C. for 30 minutes. Rinse fiber and dry.
Dye test—disperse:
  (1) 1.0% Calcosyn Blue G (Pr. #62, new C.I. #64500).
  (2) 0.2% sodium oleylmethyl tauride.
  (3) 50/1 dyebath/fiber ratio set to approx. 50° C.

(4) Enter equal weights of sample fiber and standard fiber, both previously scoured as noted above.
(5) Raise dyebath to 100° C. in 30 minutes and continue dyeing at 100° C. for 60 minutes. Rinse fiber and dry.

Dye test—cationic:
(1) 1.0% Sevron Brilliant Red 4G (new C.I. Basic Red #14, Part I).
(2) 0.5% sodium acetate.
(3) 50/1 dyebath/fiber ratio set at approx. 50° C.
(4) Enter equal weights of sample fiber and standard fiber, both previously scoured as noted above.
(5) Raise dyebath to 100° C. in 30 minutes and continue dyeing at 100° C. for 60 minutes. Rinse fiber and dry.

Results of dye-testing are summarized in Table III. All evaluations are visual approximations made by an experienced observer. All percentages listed are apparent color intensity of the sample fiber versus the standard fiber which is considered 100% in all cases.

*Table III*

| Fiber Test No. | Acid Pre-metallized, percent | Acid Milling, percent | Disperse, percent | Cationic, percent |
|---|---|---|---|---|
| 3 | 100 | 90 | 90 | 85 |
| 4 | 110 | 110 | 120 | 110 |
| 5 | 200 | 200 | 160 | 200 |
| 6 | 175 | 160 | 160 | 180 |

EXAMPLE 8

Examples 3 through 6, inclusive, are repeated exactly after which the yarn is drawn by plastic stretch as described under Example 1. Yarns having improved dye-receptivity and which are free of voids are obtained, together with other improved properties, e.g., improved abrasion resistance.

EXAMPLE 9

Examples 1 through 6 and 8 are repeated following essentially the same technique described in the individual example with the exception that the acrylonitrile polymerization product is a homopolymer of acrylonitrile. Similar results are obtained.

EXAMPLE 10

Examples 1 through 6 and 8 are repeated following essentially the same technique described in the individual example with the exception that the acrylonitrile polymerization product is a copolymer containing, by weight, at least 80%, more particularly 90%, by weight of combined acrylonitrile and the remainder is at least one other monoethylenically unsaturated substance, specifically methyl acrylate in one instance and vinyl acetate in another, combined in the copolymer molecule. Similar results are obtained.

Instead of the filamentary copolymer of acrylonitrile, vinyl acetate and 2-methyl-5-vinylpyridine employed in Examples 1 through 6 and 8, the homopolymeric acrylonitrile of Example 9, the copolymers of acrylonitrile and methyl acrylate and of acrylonitrile and vinyl acetate of Example 10, there can be used in making the filaments copolymers of:

95% acrylonitrile and 5% 2-vinylpyridine
92% acrylonitrile and 8% 2-methyl-5-vinylpyridine
95% acrylonitrile and 5% 2-vinyl-5-ethylpyridine
85% acrylonitrile, 7.5% methyl acrylate and 7.5% 2-vinylpyridine
84% acrylonitrile, 8% acrylamide and 8% 2-methyl-5-vinylpyridine
90% acrylonitrile, 5% hydroxyethyl methacrylate and 5% 2-methyl-5-vinylpyridine
86% acrylonitrile, 7% allyl alcohol and 7% 2-vinyl-5-ethylpyridine (or 7% 2-methyl-5-vinylpyridine)

One can also use any of the following copolymer compositions:

95% acrylonitrile and 5% vinyl acetate
95% acrylonitrile and 5% acrylamide
92% acrylonitrile and 8% dimethylaminoethyl methacrylate
90% acrylonitrile, 5% vinyl acetate and 5% methyl acrylate
90% acrylonitrile, 5% methacrylonitrile and 5% vinyl acetate The foregoing copolymeric acrylonitriles are processed in essentially the same manner as described under Examples 1 through 6 and 8 with similar results.

The preferred filament-forming acrylonitrile polymers that are used in making filaments, which subsequently are treated in accordance with the present invention, are those containing, by weight, at least 70% of acrylonitrile while the remainder is a monoethylenically unsaturated substance including a vinylpyridine combined in the polymer molecule, and especially those containing, by weight, at least 80% acrylonitrile and at least 2% of a vinylpyridine (preferably a methyl vinylpyridine including 2-methyl-5-vinylpyridine). A preferred subclass within this broader class is that comprised of filament-forming copolymers of, by weight, from 80% to 96% acrylonitrile, from 2% to 10% of a vinylpyridine (and which preferably includes 2-methyl-5-vinylpyridine) and from 2% to 10% of a third different monoethylenically unsaturated material, e.g., vinyl esters including the formate, acetate, propionate; the various acrylic esters including the lower alkyl acrylates and methacrylates such as the methyl, ethyl and propyl acrylates and methacrylates; the various acrylamides including acrylamide itself and methacrylamide; the various acrylic acids including acrylic acid itself and methacrylic acid; methacrylonitrile and other copolymerizable substituted acrylonitriles; unsaturated alcohols including allyl alcohol; vinyl-substituted aromatic hydrocarbons, e.g., styrene, the various ring-substituted methylstyrenes; isopropenyl toluene; and others including those given by way of example in, for instance, Cresswell U.S. Patent No. 2,558,730, dated July 3, 1951 (column 3, lines 31–55), and Price U.S. Patent No. 2,736,722, dated February 28, 1956 (column 4, line 66, through line 27 in column 5). The "third different monoethylenically unsaturated material" mentioned above includes within its meaning a plurality of such materials.

Vinylpyridines which can be employed in making copolymers with acrylonitrile, and used as herein described, are vinylpyridines represented by the formula (I)
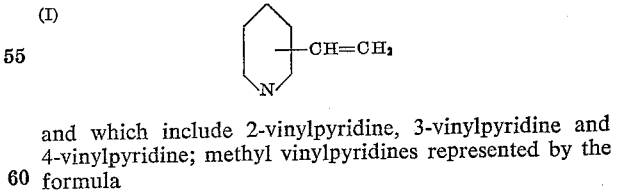

and which include 2-vinylpyridine, 3-vinylpyridine and 4-vinylpyridine; methyl vinylpyridines represented by the formula (II)
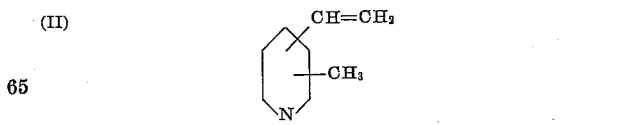

and which include 2-methyl-3-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine and 3-methyl-4-vinylpyridine. The vinylpyridines embraced by Formula II are a preferred subgroup within a broader class of vinylpyridines that are advantageously employed in making copolymers which, in filamentary form, are used in practicing the present invention and which may be represented by the formula (III) 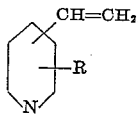

and wherein R represents a lower alkyl radical, more particularly a methyl, ethyl, propyl (including n-propyl and isopropyl) or butyl (including n-butyl, isobutyl, sec.-butyl and tert.-butyl) radical. Other examples include 2-vinyl-4,6-dimethylpyridine, the 2- and 4-vinylquinolines, 2-vinyl-4,6-diethylpyridine and others embraced by the formula (IV) 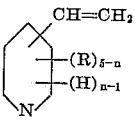

wherein R represents a lower alkyl radical, examples of which have been given hereinbefore, and $n$ represents an integer from 1 to 5, inclusive.

One can substitute in the copolymers employed in making the filaments of Examples 1 through 6 and 8 an equivalent amount of any of the vinylpyridines, of which numerous examples have just been given, for the specific vinylpyridine named in the individual copolymer, and then make spinning solutions from which filamentary polyacrylonitrile is produced and processed in accordance with the present invention.

When dye receptivity, especially toward acid dyes, is a matter of secondary consideration, the vinylpyridine can be omitted from the above-described formulations for making the copolymer.

Ordinarily, the molecular weight (average molecular weight) of the acrylonitrile homopolymer or copolymer is within the range of from about 30,000 to about 200,000, more particularly from about 40,000 to about 100,000, and still more particularly from about 60,000 to about 80,000, as calculated from a viscosity measurement of the said copolymer in dimethyl formamide using the Staudinger equation (reference: Houtz U.S. Patent No. 2,404,713, dated July 23, 1946). Acrylonitrile polymers which yield a solution having a specific viscosity at 40° C. within the range of 2 to 10 when 1 gram of the polymer is dissolved in 100 ml. of 60% aqueous sodium thiocyanate have an average molecular weight which enables the polymer to be used as a filament-forming material and such polymers can, therefore, be used in forming the spinning solutions from which are made the gelled filaments that are further processed in accordance with the present invention.

The present invention is particularly concerned with an improvement in a process of producing so-called "wet-spun" polyacrylonitrile filamentary materials. The spinning solutions employed are preferably those produced by dissolving the polymer in a solvent comprising a concentrated aqueous solution of a water-soluble salt which yields highly hydrated ions in an aqueous solution. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. As indicated hereinbefore, the preferred salt is an alkali-metal thiocyanate, specifically sodium thiocyanate. Other examples of suitable solvents are concentrated aqueous solutions of guanidine thiocyanate, the mono-(lower alkyl)-substituted guanidine thiocyanates, and the symmetrical and unsymmetrical di-(lower alkyl)-substituted guanidine thiocyanates.

Filaments spun from organic-solvent solutions of an acrylonitrile polymer, and which are wet-spun into a co-agulating bath comprising water and/or glycerol, glycol or other coagulating liquid to form the gelled filamentary material, are amenable to processing in accordance with the present invention. In making such spinning solutions the organic solvent can be dimethyl formamide or any of the other organic solvents described in the U.S. patents mentioned hereinbefore with reference to organic solvent solutions of homopolymers and copolymers of acrylonitrile, and especially those organic solvents which are soluble in or miscible with water.

The concentration of the acrylonitrile polymer in the chosen solvent should be such that a composition having a workable viscosity is obtained. This concentration will depend, for example, upon the particular solvent and extrusion apparatus employed, the diameter of the filament or other shaped article to be extruded and the average molecular weight of the polymer. The concentration may range, for example, from 6% or 7% up to 16% or 18% or more by weight of the solution. The viscosity of the solution, as determined by measuring the time in seconds for a Monel metal ball ⅛ inch in diameter to fall through 20 cm. of the solution at 61° C., may be, for instance, from 20 to 200 seconds. Usually the best spinning solutions from the standpoint of coagulation and optimum properties of the precipitated gel are those which contain the highest concentration of the acrylonitrile polymer that is consistent with solubility and viscosity characteristics. The chosen concentration may, however, require that consideration be given to other influencing factors, e.g., the optimum spinning speed for the particular production unit.

The preferred antistatic compositions used in practicing this invention are water-soluble mixtures of a surface-active quaternary ammonium antistatic agent and a water-soluble textile lubricant that is compatible therewith, more particularly water-soluble condensation products of ethylene oxide with castor oil.

The ethylene oxide condensation products of castor oil are well known, and a wide variety are available commercially. Those which are water-soluble contain a minimum of about 25 moles of combined ethylene oxide for each mole of castor oil; i.e., of ricinoleic acid triglyceride. From this minimum the condensation products may contain up to 300–500 or more moles of combined ethylene oxides per mole of castor oil. It will be understood that any of these water-soluble condensation products may be used in admixture with any suitable quaternary ammonium antistatic agent in preparing the compositions, and it is an important advantage that the proportion of combined ethylene oxide may be varied throughout a wide range to obtain varying degrees of hydrophilic properties in the lubricants. Thus, one manufacturer of castor oil-ethylene oxide condensates provides a scale designed as a "Hydrophile-Lipophile Balance" or HLB that increases with increasing ethylene oxide content. This permits selection of the most suitable lubricant for the type and denier of polyacrylonitrile filaments to be lubricated; for example, continuous filament fibers composed predominantly of polyacrylonitrile seem to require an HLB of about 13–18, corresponding to about 40–200 moles of combined ethylene oxide for best results, whereas fibers of other materials might require a different hydrophile-lipophile balance for optimum lubricity.

As is indicated above, the antistatic agents to be mixed with castor-oil-ethylene oxide condensation products in forming the composition are known quaternary ammonium surface-active agents. These are compounds having the general formula (V) 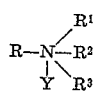

in which R is an organic radical containing a hydrophobic group and $R^1$, $R^2$ and $R^3$ are short-chain alkyl, hydroxyalkyl, alkoxyalkyl or ethenoxy (polyethylene oxide) radicals, and Y is an anion such as halide, nitrate, phosphate or other acid salt group. For the compounds of this class to be surface-active the grouping (VI)

must be hydrophilic in character, which means that the R radicals should be either hydrocarbon or hydroxyalkyl chains of from 1 to not more than 3 carbon atoms or that any group having a larger number of carbon atoms should also contain a hydrophilic substituent such as a hydroxy radical or an ether radical, or both. The radical R of Formula V may be an aliphatic hydrocarbon chain of from 7 to about 22 and preferably from 10 to 18 carbon atoms or it may consist of two or more aliphatic hydrocarbon chains connected by an ether or acid amide group. Representative quaternary ammonium antistatic agents of these classes are docecyl trimethyl ammonium chloride, octadecyl triethyl ammonium chloride, trimethyl gamma-dodecyloxy-beta-hydroxypropyl ammonium chloride and other ether-containing compounds as described in U.S. Patent No. 2,087,132 and alkylamidoalkyl trialkyl ammonium salts in which the acyl radical contains at least 7 carbon atoms.

The preferred compounds, however, are those described in U.S. Patents Nos. 2,589,674, 2,626,876 and 2,345,570, which are described accurately by the formula (VII)

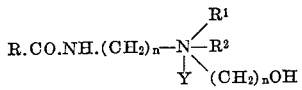

in which R is an aliphatic or alicyclic hydrocarbon radical containing at least 7 and preferably 12–18 carbon atoms, $R^1$ and $R^2$ are alkyl or hydroxyalkyl radicals containing from 1 to 3 carbon atoms, inclusive, $n$ is a whole number from 1 to 3, inclusive, and Y is an anion such as the halogen, nitrate or phosphate radical.

The ratio of castor oil-ethylene oxide condensation product to quaternary ammonium salt antistatic agent in the compositions may be varied throughout a considerable range, but ordinarily there will be at least twice as much antistatic agent as castor oil-ethylene oxide lubricant in the composition. From this minimum the quantity of antistatic agent may range upwardly to as much as ten times the weight of the lubricant. It will be understood that the lubricant-antistatic mixture is ordinarily used as a solution in water, and this solution may advantageously contain other finishing agents such as inorganic salts, bleaching agents such as hydrogen peroxide and the like.

It has been found that the mixtures of castor oil-ethylene oxide condensation products and quaternary ammonium antistatic agents described above will meet all of these requirements and give good performance when used in practicing this invention. In this application the oil is applied as a dilute aqueous solution of about 2% to 5% solids, the concentration increasing with the denier of the yarn. Application is, for example, by means of a wick or a roller running in a shallow trough. It was found that a solution containing from 1.75% to 3.2% of stearamidopropyl dimethyl beta-hydroxyethyl ammonium dihydrogen phosphate and from 0.3% to 0.5% of the condensation product of 1 mole of castor oil with 200 moles of ethylene oxide (HLB of 18) produced excellent results on a continuous filament yarn composed essentially of polyacrylonitrile and varying from 200/120 to 40/24 denier.

We claim:

1. The method of producing a filamentary material from a soluble, fiber-formable, acrylonitrile polymerization product containing an average of at least 70% by weight of combined acrylonitrile, said method comprising wet-spinning a solution of the said acrylonitrile polymerization product to form a gelled, filamentary material; continuously stretching the resulting gelled, filamentary material in the presence of moisture and at a temperature within the range of from about 60° C. to about 130° C., the amount of the applied stretch being such that the denier of the dried and relaxed filamentary material is higher than the denier of the final product; continuously drying the stretched, gelled, filamentary material to obtain a dried material which is capable of further linear shrinkage; continuously heating the dried, stretched, filamentary material, while it is relaxed and capable of contacting linearly, at a temperature higher than the temperature at which it was dried, said higher temperature and the time of heating thereat being such that no substantial decomposition of the filamentary material occurs; and continuously hot-stretching the dried and relaxed filamentary material at least 20% of its length immediately prior to said stretching, the total stretch applied to the gelled filamentary material and to the dried and relaxed filamentary material being from 5 to 24 times that of the original length of the gelled filamentary material.

2. A method as in claim 1 wherein, after continuously hot-stretching the dried and relaxed filamentary material, it is again continuously heated while it is relaxed and capable of contracting linearly at a temperature higher than the temperature at which it was dried, said higher temperature and the time of heating thereat being such that no substantial decomposition of the filamentary material occurs.

3. A method as in claim 1 wherein the gelled filamentary material is treated with an antistatic composition at a stage not later than the drying operation.

4. A method as in claim 3 wherein the antistatic composition is a water-soluble, antistatic, textile-finish composition consisting essentially of a mixture of (1) a water-soluble, castor oil-ethylene oxide condensation product and (2) a quaternary ammonium, cationic, surface-active, antistatic agent, the condensation product of (1) and the antistatic agent of (2) being present in the said mixture in a weight ratio of from 1 part of the former to from about 2 to about 10 parts of the latter.

5. A method as in claim 4 wherein the condensation product of (1) is a condensation product of castor oil and ethylene oxide in a ratio of one mole of the former to from about 40 moles to about 300 moles of the latter; and the antistatic agent of (2) is a quaternary ammonium compound represented by the general formula

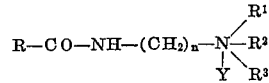

wherein R is a member of the group consisting of aliphatic and alicyclic radicals containing at least 7 carbon atoms, $R^1$ and $R^2$ are members of the group consisting of alkyl and hydroxyalkyl radicals having from 1 to 3 carbon atoms, inclusive, $R^3$ is a hydroxyalkyl radical having from 1 to 3 carbon atoms, inclusive, $n$ is a whole number from 1 to 3, inclusive, and Y is an anion.

6. A method as in claim 5 wherein the quaternary ammonium compound of (2) is a stearamidopropyl dimethyl beta-hydroxyethyl ammonium salt.

7. The method of producing a filamentary material from a soluble, fiber-formable acrylonitrile polymerization product containing an average of at least 80% by weight of combined acrylonitrile, said method comprising wet-spinning a solution of the said acrylonitrile polymerization product to form a gelled, filamentary material; continuously stretching the resulting, gelled, filamentary material in the presence of water and at a temperature within the range of from about 70° C. to about 120° C., the amount of the applied stretch being from about 100% to about 1000% that of the said filamentary material immediately prior to the said stretch; continuously applying an antistatic composition to the gelled filamentary material at a stage not later than the drying operation; continuously drying the stretched, gelled filamentary material to obtain a dried material which is capable of further linear shrinkage; continuously heating the dried, stretched, filamentary material, while it is relaxed and capable of contracting linearly, at a temperature from about 50° C. to about 250° C. above the minimum temperature required to obtain any particular percent of relaxation, said heating being effected while maintaining the percent of relaxation constant within the range of from about 3% to about 30%, thereby to improve the dye-receptivity of the said filamentary material; and continuously hot-stretching the resulting filamentary material at least 20% of its length immediately prior to said stretching, the total stretch applied to the gelled filamentary material and to the dried and relaxed filamentary material being from about 8 times to about 16 times the original length of the gelled filamentary material.

8. A method as in claim 7 wherein, after continuously stretching the dried and relaxed filamentary material, it is again continuously heated, while relaxed and capable of contracting linearly at a temperature from about 50° C. to about 250° C. above the minimum temperature required to obtain any particular percent of relaxation, said heating being effected while maintaining the percent of relaxation constant within the range of from 3% to about 30%.

References Cited in the file of this patent

UNITED STATES PATENTS 2,883,260     Melchore et al. _____ Apr. 21, 1959